US 9,116,563 B2

(12) United States Patent
Kurosawa (10) Patent No.: US 9,116,563 B2
(45) Date of Patent: Aug. 25, 2015

(54) CONNECTING TOUCH SCREEN PHONES IN A VEHICLE (71) Applicant: Fuminobu Kurosawa, Cupertino, CA (US)

(72) Inventor: Fuminobu Kurosawa, Cupertino, CA (US)

(73) Assignee: Honda Motor Co., LTD., Tokyo (JP)

( * ) Notice: Subject to any disclaimer, the term of this patent is extended or adjusted under 35 U.S.C. 154(b) by 78 days.

(21) Appl. No.: 13/661,659

(22) Filed: Oct. 26, 2012

(65) Prior Publication Data

US 2013/0106750 A1    May 2, 2013

Related U.S. Application Data (60) Provisional application No. 61/552,757, filed on Oct. 28, 2011.

(51) Int. Cl.
G06F 3/041    (2006.01)
G06F 9/44    (2006.01)

(52) U.S. Cl.
CPC .............. G06F 3/041 (2013.01); G06F 9/4445 (2013.01)

(58) Field of Classification Search
USPC ........................................................ 345/173
See application file for complete search history.

(56) References Cited

U.S. PATENT DOCUMENTS

| | | | |
|---|---|---|---|
| 6,418,444 B1 * | 7/2002 | Raduchel et al. | 717/126 |
| 6,694,434 B1 * | 2/2004 | McGee et al. | 713/189 |
| 7,292,881 B2 | 11/2007 | Seil et al. | |
| 7,295,904 B2 * | 11/2007 | Kanevsky et al. | 701/36 |
| 8,548,532 B1 * | 10/2013 | Ng | 455/569.1 |
| 8,676,270 B2 * | 3/2014 | Ukai | 455/566 |
| 8,704,632 B2 * | 4/2014 | Ohta et al. | 340/5.27 |
| 2002/0015024 A1 * | 2/2002 | Westerman et al. | 345/173 |
| 2003/0025678 A1 * | 2/2003 | Lee et al. | 345/173 |
| 2003/0156097 A1 * | 8/2003 | Kakihara et al. | 345/156 |
| 2004/0185842 A1 * | 9/2004 | Spaur et al. | 455/420 |
| 2005/0182535 A1 * | 8/2005 | Huang | 701/29 |
| 2007/0198472 A1 * | 8/2007 | Simonds et al. | 707/3 |
| 2008/0007120 A1 * | 1/2008 | Weyl et al. | 307/10.1 |
| 2009/0195513 A1 * | 8/2009 | Dybalski et al. | 345/173 |
| 2009/0209198 A1 * | 8/2009 | Chang | 455/3.06 |
| 2010/0037057 A1 * | 2/2010 | Shim et al. | 713/171 |
| 2010/0052613 A1 | 3/2010 | Leung et al. | |
| 2010/0063670 A1 * | 3/2010 | Brzezinski et al. | 701/33 |
| 2010/0127996 A1 * | 5/2010 | Kitahara et al. | 345/173 |
| 2010/0220250 A1 * | 9/2010 | Vanderwall et al. | 348/837 |
| 2011/0093153 A1 * | 4/2011 | Moinzadeh et al. | 701/29 |
| 2011/0109468 A1 | 5/2011 | Hirschfeld et al. | |

(Continued)

OTHER PUBLICATIONS

Adrian Game, "AdrianGame: iPod Accessory Serial Protocol," 2006, eight pages. [Online] [Retrieved Sep. 6, 2013] Retrieved from the Internet <URL: http:www.adriangame.co.uk/ipod-acc-pro-html.>.

(Continued)

*Primary Examiner* — Dorothy Harris
(74) *Attorney, Agent, or Firm* — Fenwick & West LLP (57) ABSTRACT

A system and method for connection management between a consumer device and a vehicle. The connection management is performed automatically using a computing device, e.g., an application executing on a smartphone. The system and method configure the vehicle and consumer device in a manner that the screen display of the consumer device is mirrored on a touch panel of the in-vehicle computer system and the consumer device is controlled remotely by the user using the touch panel of the in-vehicle computer system.

21 Claims, 4 Drawing Sheets

(56) References Cited

U.S. PATENT DOCUMENTS

| | | | |
|---|---|---|---|
| 2011/0122074 A1* | 5/2011 | Chen et al. | 345/173 |
| 2011/0128446 A1* | 6/2011 | Woo | 348/552 |
| 2011/0227843 A1* | 9/2011 | Wang | 345/173 |
| 2011/0295444 A1* | 12/2011 | Westra et al. | 701/1 |
| 2012/0050183 A1* | 3/2012 | Lee | 345/173 |
| 2012/0151214 A1* | 6/2012 | Putze | 713/176 |
| 2014/0136849 A1* | 5/2014 | Hueger et al. | 713/175 |

OTHER PUBLICATIONS customgadz.com, "General Information—customGadz Mimics," 2011, two pages. [Online] [Retrieved Nov. 11, 2011] Retrieved from the Internet <URL:http://www.customgadz.com/store/.>.

Horwitz, J., "The Complete Guide to iPhone Car Integration," Jan. 28, 2008, twelve pages. [Online] [Retrieved Nov. 11, 2011] Retrieved from the Internet <URL:http://www.ilounge.com/index.php/articles/comments/the-complete-guide-to-iphone-car-integration/.>.

nuxx.net, "Apple Accessory Protocol," Jan. 31, 2007, eight pages. [Online] [Retrieved Sep. 6, 2013] Retrieved from the Internet <URL: https://nuxx.net/wiki/Apple_Accessory_Protocol.>.

Youtube, "Control your iPhone/iPod from another touch screen monitor—Worlds' First Solution," Jan. 11, 2011, three pages. Video available at: <URL:http://www.youtube.com/watch?v=d-znz1rJPwg.>.

* cited by examiner

FIG. 1

| Items | | iPod Out (Music) | | Phone | | Physical User | |
|---|---|---|---|---|---|---|---|
| Support Contents | | iPod (Music) | | All apps if support DisplayPort (need source code to modify) | | All apps include SpringBoard | |
| Video | DisplayPort (Digital Out) | × | Not support | ○ | Supported | ○ | Supported |
| | Analog Video (Component /Composite) | ○ | Supported | ○ | Supported | ○ | Supported |
| | S-video | ○ | Supported | ○ | Supported | ○ | Supported |
| Touch Panel | USB (?) | × | Not support | × | Not support | × | Not support |
| Communication | USB (AP) | △ | Dedicated API for iPod Out limited capabilities | ○ | Full capabilities that Apple allows | ○ | Full capabilities that apple allows |
| Audio | Analog Audio (L/R) | ○ | Supported | ○ | Supported | ○ | Supported |
| | USB | ○ | Supported | ○ | Supported | ○ | Supported |
| | Bluetooth | △ | Only A2DP profile | △ | Only A2DP profile | △ | Only A2DP profile |
| Policy Controls | Mechanism to control apps | ○ | Well controlled by iPodOut | △ | We can choose which apps can display on head unit. But still need a mechanism only Honda app can display | × | No, out of control |

CONNECTING TOUCH SCREEN PHONES IN A VEHICLE

CROSS REFERENCE

This application claims the benefit under 35 U.S.C §119(e) of Provisional Application No. 61/552,757, filed Oct. 28, 2011, which is incorporated by reference in its entirety.

FIELD OF THE INVENTION

This application relates to automobiles and more particularly to vehicle pairing with communication devices.

BACKGROUND

The use of consumer devices such as smartphones has become ubiquitous in the last few years and communication between consumer devices and an automotive vehicle have existed in one form of another for years. Examples include the connection of MP3 players to analog Auxiliary Jacks, iPods being connected via USB connections, and cellular phones being connected via wireless Bluetooth connections. All of these provide methods to bring content to and from the vehicle and allow a user to have some connectivity while in the vehicle.

While a vehicle can be connected to multiple consumer devices, there are currently few methods to effectively leverage the connection options of the consumer device and the touch panel of an in-vehicle head unit.

SUMMARY

In automotive vehicles, connectivity is available in many forms for the user. Examples of connection options between a user device and a vehicle include Bluetooth, USB ports, HDMI (high-definition multimedia interface) ports, Wi-Fi, an infrared serial, an auxiliary jack and a battery electric vehicle charging connection. In particular, vehicles with hands-free phone systems use Bluetooth and/or USB links to connect iPods or iPhones to the audio systems, and/or HDMI ports to connect input video data on the in-car entertainment video system. Connectivity methods often need a solution to help the customer to control such connections. Today, the phone is the hub for many of these connections and related media and the embodiments provide a connection management solution, in which the vehicle can provide the connection management solution/tools without the use of a smartphone.

Embodiments present a system and method for connection management between a consumer device and a vehicle. The connection management is performed automatically using a computing device, e.g., an application executing on a smartphone. The system and method configure the vehicle and consumer device in a manner that the screen display of the consumer device is mirrored on a touch panel of the in-vehicle computer system and the consumer device is controlled remotely by the user using the touch panel of the in-vehicle computer system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Figure 1:
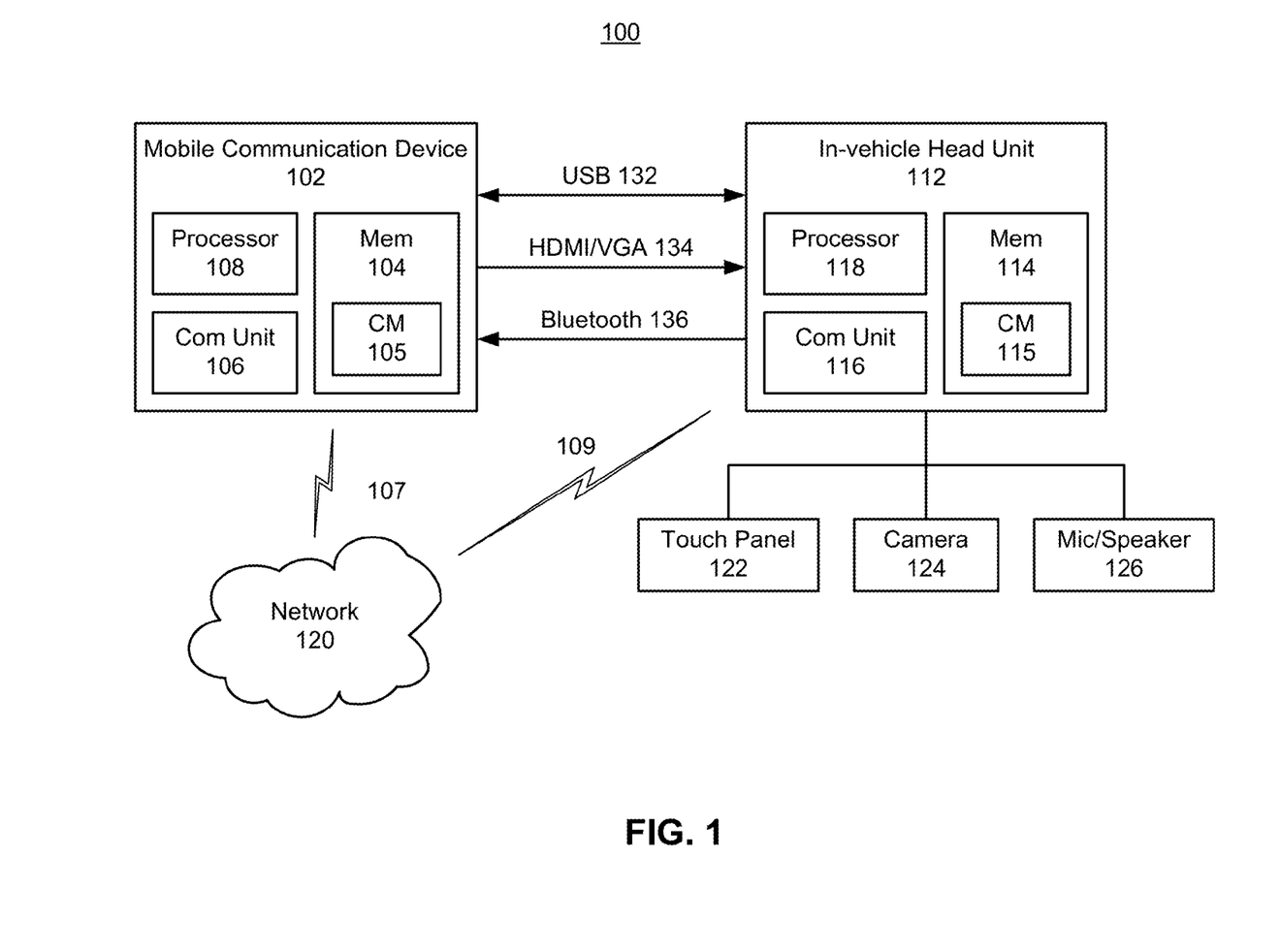
FIG. 1 is a block diagram illustrating an exemplary operating environment 100 for various embodiments.

FIG. 1 is a block diagram illustrating an exemplary operating environment 100 for various embodiments. Operating environment 100 may include an in-vehicle computer system, one example of such a system is an in-vehicle head unit 112, which will be used as an example herein for ease of discussion. The operating environment 100 may also include a wireless mobile communication device (MCD) 102, communication links 132, 134, and 136 for communication between the in-vehicle head unit 112 and wireless mobile communication device 102, a wireless communication link 107 between wireless mobile communication device 102 and a network 120, and a wireless communication link 109 between in-vehicle head unit 112 and the network 120. The communication links described herein can directly or indirectly connect these devices. The network 120 can be a wireless communication network such as a cellular network comprised of multiple base stations, controllers, and a core network that typically includes multiple switching entities and gateways, as well as one or more other networks, such as, the Internet, a public-switched telephone network (PSTN), a packet-switching network, a frame-relay network, a fiber-optic network, and/or other types of networks.

In-vehicle head unit 112 and wireless mobile communication device (MCD) 102 may communicate with each other via communication links, such as USB (Universal Serial Bus) 132, HDMI/VGA (High-Definition Multimedia Interface/Video Graphics Array) 134, and Bluetooth® 136. In-vehicle head unit 112 and wireless mobile communication device 102 may connect, or pair, with each other via the communication links. In one embodiment the in-vehicle head unit 112 can include a touch panel display system and/or an in-car PC system that includes a communications unit 116 to assist in the communications, a memory unit device 114, and a processor 118. The in-vehicle head unit 112 can be part of a vehicle's telematics system which includes memory/storage, processor(s) and communication unit(s). FIG. 1 shows the memory 114, communication unit 116 and processor 118 as being part of the in-vehicle head unit 112 for ease of discussion. The In-vehicle head unit 112 may also be integrated with peripherals, such as a touch panel 122, a camera 124, and a microphone/speaker system 126.

Processors 108 and/or 118 process data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processors can comprises an arithmetic logic unit, a microprocessor, a general purpose computer, or some other information appliance equipped to transmit, receive and process electronic data signals from the memory 104, 114, and other devices both shown and not shown in the figures.

The MCD 102 has an operating system and can include various applications either integrated into the operating system or stored in memory/storage 104 and executed by the processor 108. Examples of a wireless mobile communication device (MCD) 102 include a cellular phone, personal device assistant (PDA), smartphone, pocket personal computer (PC), laptop computer, tablet computer, smart watch or other devices having a processor, communications capability and are easily transportable, for example. In a common form, an MCD application could be part of a larger suite of vehicle features and interactions. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry devices, available from RIM, Ontario Canada, and/or applications available for Windows Mobile devices, available from Microsoft Corp., Redmond, Wash. In an embodiment the MCD 102 includes a communications unit 106 a memory unit device 104, and a processor 108. The MCD 102 has an operating system and can include various applications either integrated into the operating system or stored in memory/storage 104 and executed by the processor 108.

The embodiments provide a management tool for the many connections between the mobile communication device 102 and the in-vehicle head unit 112. In one embodiment, the communication management tool embodies software that can be installed on the mobile communication device 102 and the in-vehicle head unit 112. This software is able to setup a new connection or open an existing connection and is able to direct the information across any application connection to provide a high quality experience for the user. For example, such communication managers 105 and 115 shown in FIG. 1 can manage high-bandwidth connections (e.g. Wi-Fi, USB, etc). The communication managers 105 and 115 can turn those connections on, structure the communication style for the connections, and direct the correct media across the connections. In addition, the communication between the management tool and the vehicle can inform the vehicle systems of the status of the various connections.

In-vehicle head unit 112 may send and receive information to wireless mobile communication device 102. Wireless mobile communication device 102 may send and receive information to in-vehicle head unit 112 via communication links, such as USB 132, HDMI/VGA 134 and Bluetooth 136. Wireless mobile communication device 102 may store information received from in-vehicle head unit 112. In-vehicle head unit 112 may store information received from wireless mobile communication device 102. In some embodiments, in-vehicle head unit 112 may provide information to the wireless mobile communication device 102. Wireless mobile communication device 102 may use that information to obtain additional information from network 120. The additional information may also be obtained in response to providing information with respect to a prompt on wireless mobile communication device 102 from in-vehicle head unit 112.

One example of the MCD connecting to the in-vehicle head unit 112 is an iPhone™, which will be used as an example herein for ease of discussion. For example, an iPhone can be connected to the in-vehicle head unit 112 through a digital AV adapter. One end of the digital AV adapter connects to the iPhone's dock connector; while the other end of the adapter includes a mini-HDMI port. The mini HDMI port may connect to the HDMI or VGA interface of the in-vehicle head unit 112, so that whatever on the iPhone screen, such as apps, presentations, websites, and more to be mirrored on a touch panel of the in-vehicle head unit 112. Mirroring may result in the display of the iPhone screen and the display of the touch screen panel being the same or substantially the same, e.g., modified to account for different aspect ratios of the displays. Mirroring can also include a portion of a display, e.g., the in-vehicle panel, mirroring the other display, e.g., the iPhone display, while another portion of the in-vehicle panel (or iPhone) displays additional information. The mini HDMI port may also route digital audio to displays that support it. A second 30-pin connector built into the digital AV adapter connects the iPhone to the USB interface of the in-vehicle head unit 112, which charges and communicates with iPhone. Furthermore, the iPhone can also be paired with the in-vehicle head unit 112 through Bluetooth, which support in-vehicle hands free telephone (HFT) communication and music playback. In one embodiment, the in-vehicle head unit 112 is an in-car PC system incorporating peripherals, such as Wi-Fi client, camera, GPS (global positioning system) and vehicle signal interface.

Figure 2:
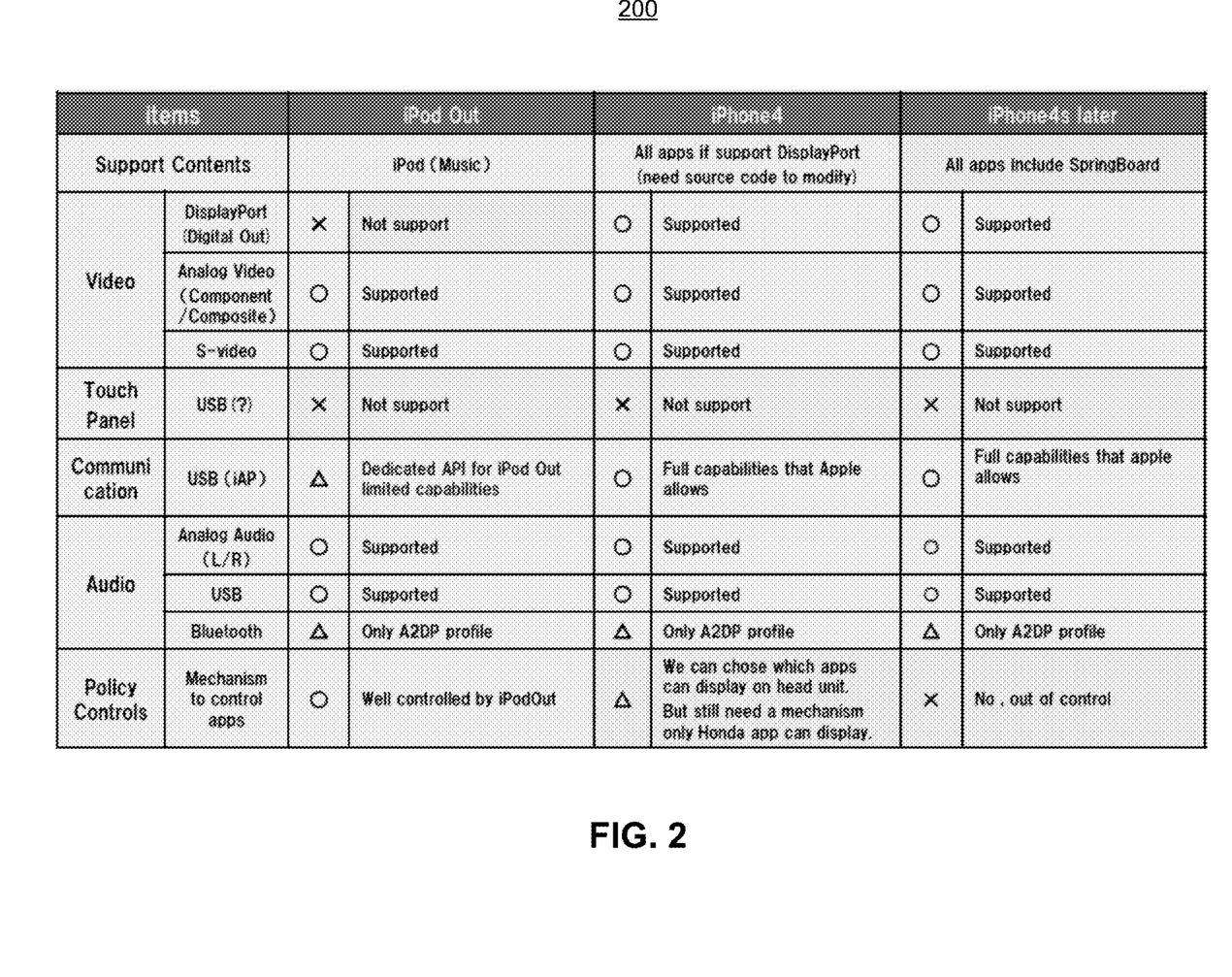
FIG. 2 is a block diagram illustrating a matrix showing supported features of various devices when connected to the in-vehicle head unit, in accordance with one embodiment.

FIG. 2 is a block diagram illustrating a matrix showing supported features of various devices when connected to the in-vehicle head unit, in accordance with one embodiment. The various devices include iPod, iPhone 4 and iPhone 4s or later. The supported features by the in-vehicle head unit cover aspects such as audio, video, touch screen, communication, and policy control. For example, video output from iPods and iPhones is supported by either digital output (e.g., DisplayPort and HDMI) or analog output (e.g., component, S-Video, or composite). As described above, the digital AV adapter can output HD video from an iPhone through mini-HDMI port. The USB connection between an iPod or iPhone and the in-vehicle head unit is also supported for communication and audio transmission. In addition, the audio signal can be transmitted from earphone plug over an analog line or Bluetooth with A2DP profile.

Bluetooth includes a variety of protocols or profiles. A Bluetooth profile is a wireless interface specification for Bluetooth-based communication between devices. In order to use Bluetooth technology, a device must be compatible with the subset of Bluetooth profiles necessary to use the desired services. A Bluetooth profile resides on top of the Bluetooth Core Specification and (optionally) additional protocols. For example, there are hands-free profile (HFP) 1.5 implementations using both Bluetooth 2.0 and Bluetooth 1.2 core specifications. The advanced audio distribution profile (A2DP) defines how high quality audio can be streamed from one device to another over a Bluetooth connection. For example, music can be streamed from an iPhone to a wireless headset or vehicle audio system.

With respect to FIG. 1, the connection managers 105 and 115, in one embodiment, identify the connections/protocols that are available and possible features/services that can be used. It is envisioned that additional connections, e.g., protocols and/or connections, can be used without departing from the scope of the embodiments, e.g., future wireless protocols. The possible features in the example illustrated in FIG. 2 include: phone voice, phone data, music audio, music data, video audio, video data, and Internet access.

Conventionally, the touch panel of in-vehicle head unit 112 cannot control apps running on an iPhone, nor is there a policy control mechanism to control which apps can be launched when the iPhone is connected to in-vehicle head unit 112 through a USB port. Embodiments described herein facilitate a mechanism to enable/disable the launch and control of apps from the in-vehicle head unit 112 to which a mobile communication device with a touch screen is connected. The mechanism allows users to mirror the display of the mobile communication device, such as an iPhone, on the touch panel of the in-vehicle head unit 112, and also to receive user gestures from the touch panel of the in-vehicle head unit 112. The received user gestures are transformed and transmitted back to the mobile communication device, so that apps can be launched and controlled remotely from the in-vehicle head unit 112. The user gestures supported include drag, tap, flick, swipe, slide, as well as multi-touch gestures, such as pinching. Furthermore, the mechanism also imposes a physical layer restriction on app launching as a policy control, which is described in greater detail herein.

Figure 3:
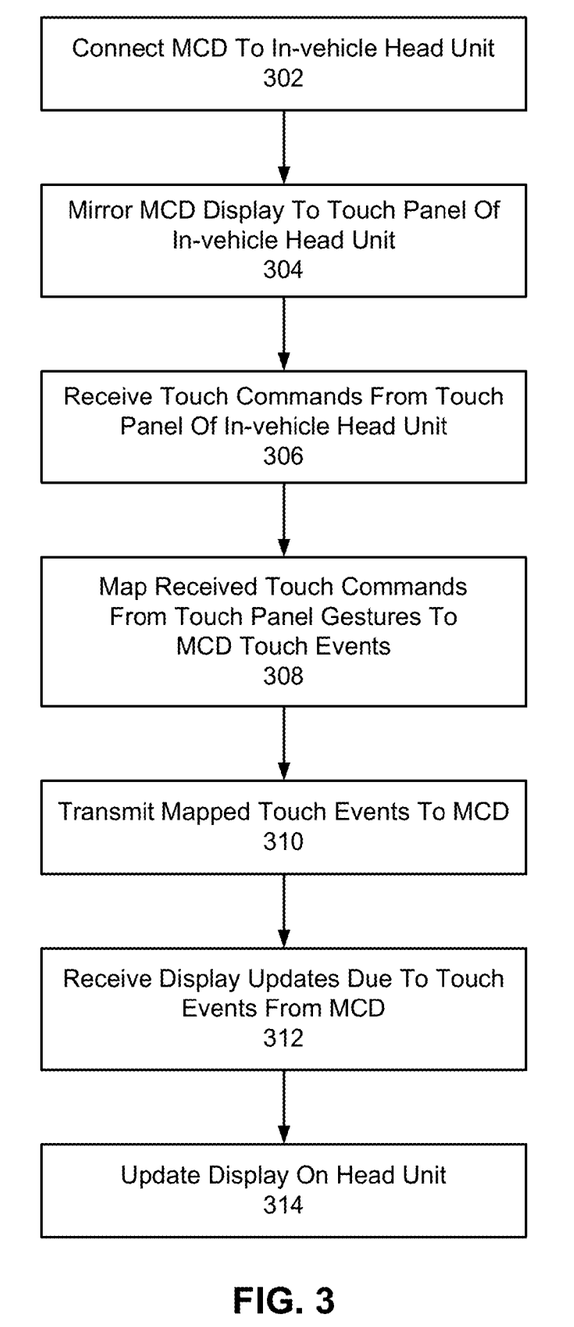
FIG. 3 is a flowchart illustrating a method for mapping user gestures on a touch panel of the in-vehicle head unit to a touch event on the mobile communication device, in accordance with one embodiment.

FIG. 3 is a flowchart illustrating a method for mapping user gestures on the touch panel of the in-vehicle head unit to a touch event on the mobile communication device, in accordance with one embodiment. In one embodiment, the software module is executed on In-vehicle head unit 112 and can also include software executed on the MCD 102. The software module can be a software program, e.g., a connection manager 115 stored in memory 114. The software can be an application, such as an iPhone™ or Android™-based application. The application can be stored on the MCD 102 and can be part of the embedded software of the MCD 102 or integrated into the MCD's 102 operating system. Alternatively, the application can be downloaded via a wired or wireless system, e.g., using Apple's AppStore™. For ease of discussion, the following description will be based on the model of the software module being an application that is stored in the MCD memory module 104 and executed by the MCD processor 108. The software module will be referred to as a Honda application (app), although the application does not need to be created by Honda.

First, the mobile communication device (MCD) is connected 302 to the in-vehicle head unit. For example, the MCD 102 is connected to the in-vehicle head unit 112 over various communication links as shown in FIG. 1. The data and control between the MCD 102 and head unit 112 are exchanged through the USB link 132. Video and display data from the MCD 102 is transmitted to the head unit 112 over the HDMI/VGA link 134, while the Bluetooth link 136 hooks up the in-car sound system including microphone and speakers 126 to the MCD 102.

Next, the touch panel in the in-vehicle head unit mirrors 304 the display of the MCD, and the in-vehicle head unit receives 306 user gestures from the touch panel of the in-vehicle head unit. The user gestures include any touch commands supported by the touch panel system of the in-vehicle head unit, such as drag, scroll, flick, tap or double tap, swipe, and multi-touch gestures like pinch. Subsequently, the received touch commands from the touch panel of the in-vehicle head unit are mapped 308 to MCD touch events. For example, since the touch panel may have a different resolution from the MCD screen, the coordinates of the touch panel need to be transformed to a corresponding coordinate on MCD 102. Given a touch coordinate (X_h, Y_h) on the head unit, touch panel resolution of the head unit C_x by C_y, and MCD screen resolution B_x by B_y, the corresponding MCD coordinates (X_m=X_h*B_x/C_x, Y_m=Y_h*B_y/C_y). The mapped touch events may comprise additional attributes, such as touch phase, gesture type, tap count, and timestamp, among others.

Once the mapped touch events are transmitted 310 to the MCD 102, the MCD 102 performs actions in response to the touch events. The action taken by the MCD may have the display on the MCD screen updated due to the touch events. After receiving 312 the display updates due to the touch events from the MCD 102, the in-vehicle head unit updates its display on the touch panel accordingly.

An example touch event can be the user starting a music play app remotely from the in-vehicle head unit. After the user connects a smartphone (e.g., an iPhone 4s) to the in-vehicle head unit, the in-vehicle head unit mirrors the display of the smartphone. The user then launches a music play app by tapping on the app icon on the touch panel of the in-vehicle head unit. Next, the touch command initiated by the user is mapped to a touch event of the smartphone and transmitted to the smartphone. The smartphone launches the music play app and the app is displayed on both the phone and the in-vehicle head unit. The user may further choose a song to play or launch other apps from the touch panel of the in-vehicle head unit.

Figure 4:
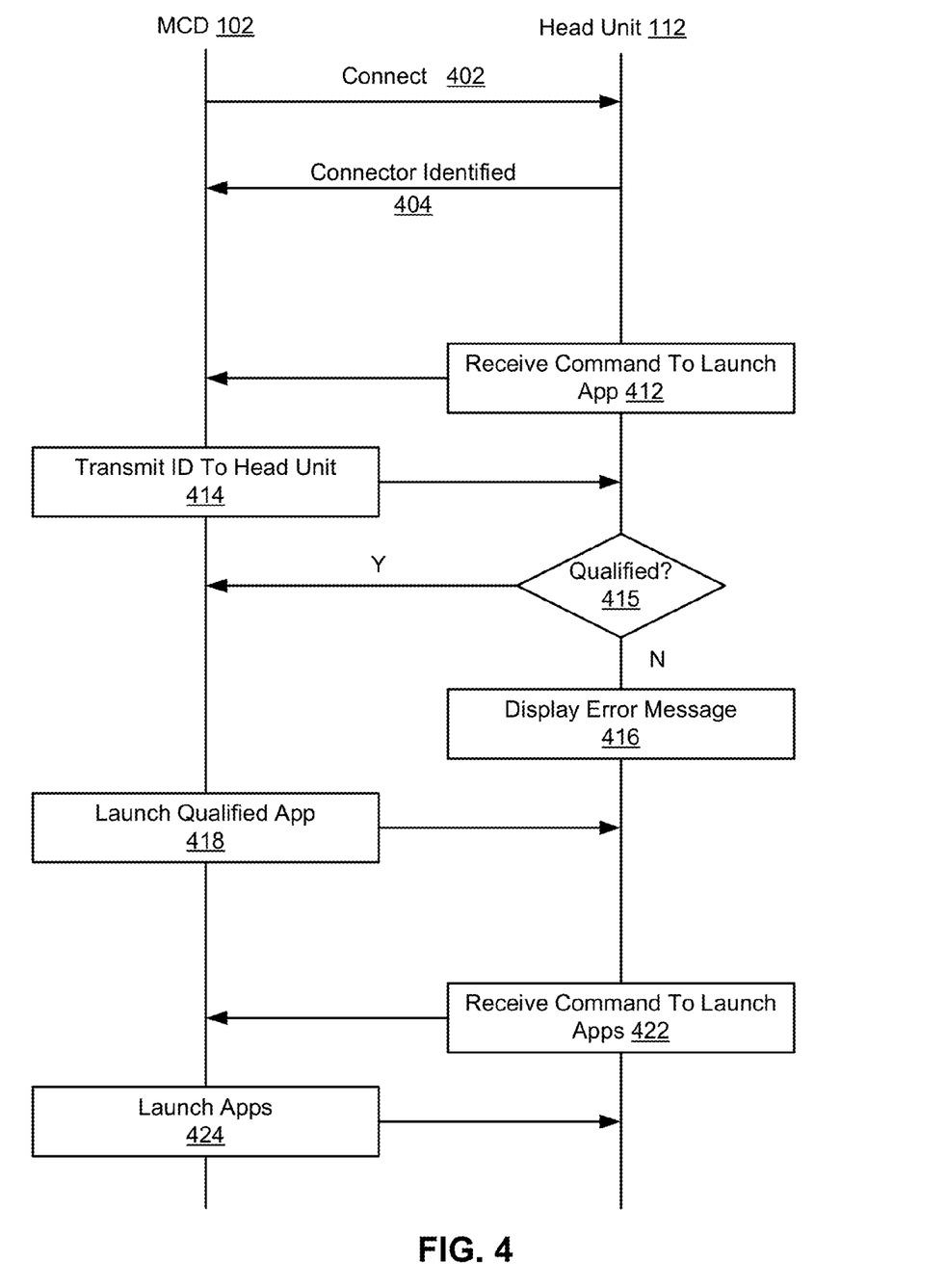
FIG. 4 is a flowchart illustrating an event trace of policy control between the in-vehicle head unit and the mobile communication device in accordance with one embodiment.

In one embodiment, a policy control mechanism is implemented to verify an MCD 102 before allowing apps to be remotely launched. FIG. 4 is a flow chart illustrating an event trace of such policy control mechanism between the in-vehicle head unit and the mobile communication device in accordance with one embodiment. The policy control mechanism comprises restrictions imposed on both physical layer and application layer. The physical layer restriction checks whether the MCD is connected 402 to the head unit via a specific interface, for example, a 30-pin connector of the iPhone. If the specific interface connection is identified 404, the connection is authorized. Otherwise, the connection is rejected. For example, in reference to FIG. 1, it is envisioned that the connection manager 105/115 can recognize and control protocols/profiles/connections that are set forth herein. In another example, when connected, the MCD may transmit its identifier (ID) to the head unit. The identifier can be a device ID, a serial number, an International Mobile Station Equipment Identity (IMEI), or any other preconfigured identifier. Once receiving the ID, the head unit verifies whether the ID is registered at the head unit. If so, the head unit returns true to the MCD, which launches the initial app. Otherwise, the head unit rejects the connection.

The application layer restriction is enforced when the connection manager software 115 in the in-vehicle head unit 112 and the connections manager software 105 in the MCD 102 initiate communications, for example, to launch an app remotely from the in-vehicle head unit. The connection manager software or the initial app allows users to configure qualified apps on the MCD 102 that can be launched remotely. App identifiers (IDs) for the qualified apps are stored in a list by the in-vehicle head unit 112. Each app ID is a unique string identifying an app, which can be a serial number of any preconfigured identifiers. The head unit receives 412 a command to launch an app either from an API call or from a user touch command. The MCD then transmits 414 the app ID to the head unit, which verifies 415 whether the ID is among the list of qualified apps. If so, the head unit returns true to the MCD, which launches 418 the qualified app. Otherwise, the head unit displays 416 an error message, such as "The app is not qualified to be launched," on the touch screen.

In one embodiment, after successful verifications at both physical layer and application layer, the connections between the MCD and the in-vehicle head unit are setup. Applications on the MCD can be launched 422 remotely either by simply tapping the icon on the touch panel of the head unit, or by a system API call specifying the app. The MCD in response launches 424 the apps, for example, by mapping the tapping gesture to a MCD touch events as described with reference to method shown in FIG. 3.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method of communication between a mobile communication device and a vehicle, the method comprising:
    coupling the mobile communication device to an in-vehicle head unit, the mobile communication device having a touch screen and the in-vehicle head unit having a touch panel;
    identifying a communication interface that couples the mobile communication device to the in-vehicle head unit;
    verifying through a policy control mechanism that the communication interface is a connection interface specified by the connections manager;
    mirroring the display of the mobile communication device on the touch panel of the in-vehicle head unit;
    receiving a touch command from the touch panel of the in-vehicle head unit, wherein the touch command corresponds to a command to launch an application displayed on the mobile communication device;
    mapping the received touch command to a touch event on the mobile communication device;
    transmitting the mapped touch event to the mobile communication device;

verifying through the policy control mechanism that the application to be launched is a qualified application, responsive to receiving the touch command to launch the application;

receiving display updates due to the touch event from the mobile communication device, responsive to the policy control mechanism successfully verifying the communication interface and successfully verifying the application to be launched; and updating the display on the touch panel of the in-vehicle head unit based on the received display update.

2. The method of claim 1, wherein the mobile communication device is coupled to the in-vehicle head unit via at least one of communication interface: USB, HDMI, VGA, Wi-Fi, and Bluetooth.

3. The method of claim 1, wherein the touch command received from the touch panel of the in-vehicle head unit is at least one of: drag, scroll, flick, swipe, slide, tap, double tap and other multi-touch gestures.

4. The method of claim 1, wherein mapping the received touch command to a touch event on the mobile communication device comprises:

transforming a coordinate of the touch command on the touch panel of the in-vehicle head unit to another coordinate on the touch screen of the mobile communication device based on the display resolution of the touch panel of the in-vehicle head unit and the touch screen of the mobile communication device.

5. The method of claim 4, wherein mapping the received touch command to a touch event on the mobile communication device further comprises:

determining touch event parameters including touch phase, gesture type, tap count, and timestamp.

6. The method of claim 1, wherein the method further comprises:

launching a connection management application at the in-vehicle head unit based on verified communication interface and matching device identifiers; and launching a qualified app from the touch panel of the in-vehicle head unit based on matching app identifiers.

7. The method of claim 1, wherein the identifier of the mobile communication device includes a device identifier, an International Mobile Station Equipment Identity (IMEI), and a serial number.

8. A system for communication between a mobile communication device and a vehicle, comprising:

a vehicle;

a mobile communication device, coupled the to an in-vehicle head unit, the mobile communication device having a touch screen and the in-vehicle head unit having a touch panel; and a connections manager, wherein the connections manager performs a method comprising:

identifying a communication interface that couples the mobile communication device to the in-vehicle head unit;

verifying through a policy control mechanism that the communication interface is a connection interface specified by the connections manager;

mirroring the display of the mobile communication device on the touch panel of the in-vehicle head unit;

receiving a touch command from the touch panel of the in-vehicle head unit, wherein the touch command corresponds to a command to launch an application displayed on the mobile communication device;

mapping the received touch command to a touch event on the mobile communication device;

transmitting the mapped touch event to the mobile communication device;

verifying through the policy control mechanism that the application to be launched is a qualified application, responsive to receiving the touch command to launch the application;

receiving display updates due to the touch event from the mobile communication device, responsive to the policy control mechanism successfully verifying the communication interface and successfully verifying the application to be launched; and updating the display on the touch panel of the in-vehicle head unit based on the received display update.

9. The system of claim 8, wherein the mobile communication device is coupled to the in-vehicle head unit via at least one of communication interface: USB, HDMI, VGA, Wi-Fi, and Bluetooth.

10. The system of claim 8, wherein the touch command received from the touch panel of the in-vehicle head unit is at least one of: drag, scroll, flick, swipe, slide, tap, double tap and other multi-touch gestures.

11. The system of claim 8, wherein mapping the received touch command to a touch event on the mobile communication device comprises:

transforming a coordinate of the touch command on the touch panel of the in-vehicle head unit to another coordinate on the touch screen of the mobile communication device based on the display resolution of the touch panel of the in-vehicle head unit and the touch screen of the mobile communication device.

12. The system of claim 11, wherein mapping the received touch command to a touch event on the mobile communication device further comprises:

determining touch event parameters including touch phase, gesture type, tap count, and timestamp.

13. The system of claim 9, wherein the method further comprises:

launching a connection management application at the in-vehicle head unit based on verified communication interface and matching device identifiers; and launching a qualified app from the touch panel of the in-vehicle head unit based on matching app identifiers.

14. The system of claim 9, wherein the identifier of the mobile communication device includes a device identifier, an IMEI, and a serial number.

15. A non-transitory computer-readable storage medium storing computer-executable program instructions for communication between a mobile communication device and a vehicle, the instructions when executed cause at least one processor to perform a method comprising:

coupling the mobile communication device to an in-vehicle head unit, the mobile communication device having a touch screen and the in-vehicle head unit having a touch panel;

identifying a communication interface that couples the mobile communication device to the in-vehicle head unit;

verifying through a policy control mechanism that the communication interface is a connection interface specified by the connections manager;

mirroring the display of the mobile communication device on the touch panel of the in-vehicle head unit;

receiving a touch command from the touch panel of the in-vehicle head unit, wherein the touch command corresponds to a command to launch an application displayed on the mobile communication device;

mapping the received touch command to a touch event on the mobile communication device;

transmitting the mapped touch event to the mobile communication device;

verifying through the policy control mechanism that the application to be launched is a qualified application, responsive to receiving the touch command to launch the application;

receiving display updates due to the touch event from the mobile communication device, responsive to the policy control mechanism successfully verifying the communication interface and successfully verifying the application to be launched; and updating the display on the touch panel of the in-vehicle head unit based on the received display update.

16. The computer-readable storage medium of claim 15, wherein the mobile communication device is coupled to the in-vehicle head unit via at least one of communication interface: USB, HDMI, VGA, Wi-Fi, and Bluetooth.

17. The computer-readable storage medium of claim 15, wherein the touch command received from the touch panel of the in-vehicle head unit is at least one of:

drag, scroll, flick, swipe, slide, tap, double tap and other multi-touch gestures.

18. The computer-readable storage medium of claim 15, wherein mapping the received touch command to a touch event on the mobile communication device comprises:

transforming a coordinate of the touch command on the touch panel of the in-vehicle head unit to another coordinate on the touch screen of the mobile communication device based on the display resolution of the touch panel of the in-vehicle head unit and the touch screen of the mobile communication device.

19. The computer-readable storage medium of claim 18, wherein mapping the received touch command to a touch event on the mobile communication device further comprises:

determining touch event parameters including touch phase, gesture type, tap count, and timestamp.

20. The computer-readable storage medium of claim 15, wherein the method further comprises:

launching a connection management application at the in-vehicle head unit based on verified communication interface and matching device identifiers; and launching a qualified app from the touch panel of the in-vehicle head unit based on matching app identifiers.

21. The computer-readable storage medium of claim 15, wherein the identifier of the mobile communication device includes a device identifier, an IMEI, and a serial number.

* * * * *